United States Patent [19]

Simmons

[11] Patent Number: 5,292,876
[45] Date of Patent: Mar. 8, 1994

[54] MIXED CELLULOSE ESTERS

[75] Inventor: Kenneth E. Simmons, Blountville, Tenn.

[73] Assignee: Eastman Kodak Company, Rochester, N.Y.

[21] Appl. No.: 555,223

[22] Filed: Jul. 20, 1990

[51] Int. Cl.$^5$ .............................. C08B 3/00; C08B 3/16
[52] U.S. Cl. ......................................... 536/63; 536/64; 536/65
[58] Field of Search ............................... 536/63, 64, 65

[56] References Cited

U.S. PATENT DOCUMENTS

| | | | |
|---|---|---|---|
| 2,327,770 | 8/1943 | Crane | 536/76 |
| 2,423,823 | 7/1947 | Baker | 536/65 |
| 2,439,111 | 9/1945 | Tamblyn et al. | 536/65 |
| 2,629,716 | 2/1953 | Morgan | 536/65 |
| 2,836,590 | 5/1958 | Turner | 536/76 |

FOREIGN PATENT DOCUMENTS 356012 10/1930 United Kingdom.

OTHER PUBLICATIONS

G. G. Vasil'eva and G. A. Petropavlovskii, *Zhurnal Prikladnoi Khimii*, 49, pp. 622–626 English translation (1976).
Chemical Abstracts, vol. 32 (23) 1924 (S. Lee, *J. Soc. Chem. Ind. Japan 40*, Suppl. binding 459 (1937).

*Primary Examiner*—John Kight, III
*Assistant Examiner*—Jeffrey Culpeper Mullis
*Attorney, Agent, or Firm*—Betty J. James; William P. Heath, Jr.

[57] ABSTRACT

Disclosed are novel species of cellulose acetate butyrates and propionates that have significant surface activity. The cellulose acetate butyrate/propionate contains 9–16 wt. % butyryl or propionyl, 6–11 wt. % acetyl, and 12–15 wt. % hydroxyl.

15 Claims, No Drawings

MIXED CELLULOSE ESTERS

FIELD OF THE INVENTION

The present invention relates to novel cellulose acetate butyrates/propionates having a specific amount of substitution which surprisingly function as nonionic surfactants.

BACKGROUND OF THE INVENTION

It is well known in the art that cellulose acetate with low degree of substitution have high affinity for water. C. J. Malm (British Patent 356,012 (1929)) disclosed the preparation of cellulose monoacetate by the sulfuric acid-catalyzed hydrolysis of cellulose triacetate in aqueous sulfuric acid. The product, having a DS of 0.6–0.8 acetyls (DS=number of substituents per anhydroglucose ring), was soluble in water. This process included long reaction times, and the necessity for continuous or sequential addition of water to maintain reaction rates, resulting in a dilute reaction mixture and difficulties in recovery of by-product acetic acid. Additionally, the sulfuric acid catalyst promotes rapid degradation of the molecular weight of the polymer.

In U.S. Pat. No. 2,836,590 (1958) H. W. Turner discloses high temperature (>180° C.) alcoholysis of cellulose acetate without the use of catalysts. At the temperatures disclosed by Turner, cleavage of the 1,4-glycosidic linkages of the cellulose ester backbone competes with the desired deacylation.

Russian workers studied the partial hydrolytic elimination of ester groups from cellulose acetate butyrate in acetic acid/water (78% acid) for the purpose of chemically crosslinking these materials with dimethylolethyleneurea. The cellulose acetate butyrate was hydrolyzed to a DS of 1.5 butyryl with no acetyl present. [Vasil'eva, G. G. and Petropavlovskii, G. A., Zhurnal Prikladnoi Khimii, 49, (pp. 622–26 Eng. Trans.) (1976)].

A reference to foaming tendency of benzene solutions of cellulose esters of the higher fatty acids (lauryl, dipalmityl, tripalmityl, and tristearyl cellulose) indicated that the surface tension of these solutions was not responsible for foam formation. [Lee, J. Soc. Chem Ind. Japan 40, Suppl. binding 459 (1937)].

Heretofore, cellulose acetate butyrates and cellulose acetate propionates that have significant surface activity and that form stable foams in aqueous systems have been unknown.

SUMMARY OF THE INVENTION

I have surprisingly discovered novel species of cellulose acetate butyrates ("CAB's") and cellulose acetate propionates ("CAP's") that have significant surface activity and that form stable foams in aqueous systems; i.e., the CAB/CAP functions as a nonionic surfactant. More specifically, the present invention is directed to a cellulose acetate butyrate or propionate having 9 to 16 weight % butyryl or propionyl; 6 to 11 weight % acetyl; and 12 to 15 weight % hydroxyl; wherein said cellulose acetate butyrate or propionate has a surface tension of less than about 45 dynes/cm measured as a 0.1 weight % aqueous solution.

DETAILED DESCRIPTION OF THE INVENTION

The cellulose acetate butyrate or propionate of the present invention shall be alternatively referred to herein as "cellulose monobutyrate" in the case of CAB or "cellulose monopropionate" in the case of CAP. The degree of substitution (DS) for acetyl of the cellulose monobutyrate or cellulose monopropionate is about 0.4–0.5 and the DS for butyryl or propionyl is about 0.4–0.5. DS can be defined as the number of acyl groups per anhydroglucose ring.

The cellulose monobutyrate and cellulose monopropionate of the present invention have been surprisingly found to have significant surface activity. This is in contrast to similar cellulose esters outside the scope of the present invention which do not share this significant surface activity. The surface tension as measured as a 0.1 weight % solution in water of the cellulose monobutyrate of the invention typically is less than about 45 dynes/cm and preferably ranges from about 37 to about 41 dynes/cm. Also, a 0.1 weight % solution of the cellulose monobutyrate or cellulose monopropionate of the invention typically has a foam height of at least about 7.5 cm, preferably at least about 9 cm, when measured in the Ross Miles Foam Test. The Ross Miles Foam Test is well known in the art as a means for determining both foam formation and foam stability. Thus, a 0.1 weight % solution of the cellulose monobutyrate or cellulose monopropionate of the invention preferably retains at least about 55%, more preferably at least about 72%, of initial foam height after 15 minutes as measured in the Ross Miles Foam Test.

The inherent viscosity (I.V.) of the cellulose monobutyrate or cellulose monopropionate of this invention is typically about 0.01 to about 1.50, preferably about 0.05 to about 0.25. I.V. can be determined by using a Schott-Gerate AVS 24 instrument operating at 25° C. at a sample concentration of 0.25 g per 100 ml of dimethylsulfoxide (DMSO).

The novel cellulose monobutyrate and cellulose monopropionate of the present invention can be prepared by techniques known in the art or by techniques taught in the Examples section hereof. Typically, a cellulose acetate butyrate or propionate of high degree of substitution (e.g., fully substituted, i.e., DS of 3) is subjected to solvolysis to form the cellulose monobutyrate or monopropionate of the invention. Preferred starting cellulose acetate butyrates for this process preferably have an acetyl content of about 12–30 weight % (DS of about 1–2) and a butyryl content of about 17.37 weight % (DS of about 0.7–1.7); while the preferred starting cellulose acetate propionates have an acetyl content of about 2.5 weight % (DS of about 0.2) and a propionyl content of about 40–46 weight % (DS of about 1.5–2.5). The temperature for the solvolysis process is typically about 140° C. to about 160° C. and the reaction period is typically about 12 hours to about 16 hours. Preferably, the reaction is run at about 100 to about 500 pounds per square inch (psi) under an inert gas such as nitrogen. Acetic acid is typically used as catalyst or solvolysis promoter but other carboxylic acids can be employed if desired. Similarly, methanol is typically used as a reactive solvent but other alcohols or water can be used as reactive solvents if desired. The desired cellulose monobutyrate or monopropionate can be isolated by solvent stripping, spray drying or freeze drying.

The cellulose monobutyrates and monopropionates of the invention can be used in many applications where a nonionic surfactant is desirable. Since the cellulose monobutyrates and monopropionates are considered nontoxic, they are particularly useful in food-related applications. This would include food emulsions such as cakes and other baked goods.

Foaming power and foam stability are perceived to be advantageous, either in the action of the formulation or for esthetic reasons. Prime examples of applications where the foaming power of the cellulose monobutyrates or monopropionates of the invention would be useful include detergents, soaps, dishwashing liquids, cleaning wipes, and disinfecting cleaners. These materials also are preferably hypoallergenic, and therefore useful in personal care products such as shampoos, shaving creams, and cosmetic formulations.

Foams and surfactants also have wide technical importance in the fields of enhanced oil recovery and fire fighting. The compositions of the present invention should be biodegradable, and thus of interest in these applications. Nonionic surfactants such as the cellulose monobutyrate or monopropionate of the invention should also have utility in coatings and ink formulations.

This invention will now be described in greater detail by reference to the following non-limiting examples.

EXAMPLES

Example 1

Reactants were loaded into a 1-liter glass laboratory autoclave (Buchi) equipped with a magnetically coupled agitator. The jacketed reactor was heated with circulating oil from an external circulatory bath (Haake). The reactor was purged with nitrogen, sealed, then heated to the contact temperature of 155° C. with stirring at 125 rpm. Heat-up time was about 1 hr. Reactor pressure was 25 psi nitrogen initially, but increased to about 125 psi at reaction temperature. Reaction was carried out at 155° C. for 4 hrs., 79 g. of methanol was pumped to the reactor during the next hour, and the reaction was maintained at these conditions for a total of 14 hrs. The reaction mixture was allowed to cool to about 65° C., which took less than 1 hr. The product was isolated from the solution by spray-drying. Reactants and key results are as follows:

| Starting Cellulose Ester | Acetate Butyrate (17% Acetyl, 32% Butyryl) |
|---|---|
| Weight (g) | 50 |
| Catalyst | Acetic Acid |
| Weight (g) | 340 |
| Reactive Solvent (Charge) | Methanol |
| Weight (g) | 79 |
| Reactive Solvent (Feed) | Methanol |
| Weight (g) | 79 |
| Product | Cellulose Acetate Butyrate |
| Key Analyses | 8% Acetyl, 16% Butyryl, 15% OH, Surface tension 40.5 dynes/cm. (0.1% aqueous solution) |

Example 2

Reactants were loaded into a 1-liter stainless steel high pressure rocking autoclave. The reactor was purged with nitrogen, sealed, and heated to the contact temperature of 155° C. with the rocker on. Heat-up time was 1.5 hr. The initial pressure in the reactor was 200 psi nitrogen. Reaction was carried out at these conditions for 4 hrs., 79 g. of methanol was charged in four increments from a blow-case over a 1-hr. period, and the reaction maintained for a total of 14 hrs. The reaction mixture was allowed to cool to room temperature (about 2 hrs.). The product was isolated by evaporation of solvent, addition of a non-solvent (acetone), followed by filtration. Reactants and key results are as follows:

| Starting Cellulose Ester | Acetate Butyrate (29% Acetyl, 17% Butyryl) |
|---|---|
| Weight (g) | 50 |
| Catalyst | Acetic Acid |
| Weight (g) | 340 |
| Reactive Solvent (Charge) | Methanol |
| Weight (g) | 79 |
| Reactive Solvent (Feed) | Methanol |
| Weight (g) | 79 |
| Product | Cellulose Acetate Butyrate |
| Key Analyses | 11% Acetyl, 9% Butyryl, Surface tension 40.5 dynes/cm. (0.1% aqueous solution) |

Example 3

Reactants were loaded into a 1-liter glass laboratory autoclave (Buchi) equipped with a magnetically coupled agitator. The jacketed reactor was heated with circulating oil from an external circulatory bath (Haake). The reactor was purged with nitrogen, sealed, then heated to the contact temperature of 150° C. with stirring at 125 rpm. Heat-up time was about 1 hr. Reactor pressure was 25 psi nitrogen initially, but increased to about 125 psi at reaction temperature. Reaction was carried out at 150° C. for 4 hrs., 79 g. of methanol was pumped to the reactor during the next hour, and the reaction was maintained at these conditions for a total of 12 hrs. The reaction mixture was allowed to cool to about 65° C., which took less than 1 hr. The product was isolated from the solution by spray-drying. Reactants and key results are as follows:

| Starting Cellulose Ester | Acetate Propionate (2.5% Acetyl, 46% Propionyl) |
|---|---|
| Weight (g) | 50 |
| Catalyst | Acetic Acid |
| Weight (g) | 340 |
| Reactive Solvent (Charge) | Methanol |
| Weight (g) | 79 |
| Reactive Solvent (Feed) | Methanol |
| Weight (g) | 79 |
| Product | Cellulose Acetate Propionate |
| Key Analyses | 6% Acetyl, 13% Propionyl, 16% OH, Surface tension 44.4 dynes/cm. (0.1% aqueous solution) |

Example 4

The following surface tension measurements were done using the Whilhelmy Plate Method and 0.1% aqueous solutions of each material.

TABLE I

| Sample Identification | Surface Tension, Dynes/Cm. |
|---|---|
| Sodium Dodecyl Sulfate | 34.4 |
| Hydroxyethylcellulose | 55.8 |
| Cellulose Monobutyrate[1] | 40.1 |
| Cellulose Monobutyrate[2] | 40.5 |
| Cellulose Monobutyrate[3] | 37.6 |
| Cellulose Monopropionate[4] | 44.4 |
| Cellulose Monoacetate[5] | 55.6 |

TABLE I-continued

| Sample Identification | Surface Tension, Dynes/Cm. |
|---|---|
| Cellulose Monoacetate[6] | 53.2 |

[1]Isolated by solvent stripping, same acetyl, butyryl and hydroxyl content as Example 1.
[2]Isolated by spray-drying, same acetyl, butyryl and hydroxyl content as Example 1.
[3]Isolated by freeze-drying, same acetyl, butyryl and hydroxyl content as Example 1.
[4]Isolated by spray drying, 6 wt. % acetyl, 13 wt. % propionyl, 16 wt. % hydroxyl.
[5]Magnesium-catalyzed CMA, 16 wt. % acetyl, 19 wt. % hydroxyl.
[6]Molybdenum-catalyzed CMA, 16 wt. % acetyl, 19 wt. % hydroxyl.

This example demonstrates the surface activity of the cellulose ester compositions of the present invention.

Example 5

Those skilled in the art recognize the Ross Miles Test as a standard in the field for determining both foam formation and foam stability. The following data demonstrate these properties, as well as ability to foam in the presence of high concentration of electrolytes, for the compositions of the present invention.

ROSS MILES FOAM TEST[1]

| | | (A) Deionized Water | | (B) 400 PPM Hardness Water | |
|---|---|---|---|---|---|
| | | Time, Min | Foam Ht, Cm | Time, Min | Foam Ht, Cm |
| I. | Cellulose Monoacetate (acid-catalyzed, 16 wt. % acetyl, 19 wt. % hydroxyl) | | | | |
| | | 0 | 9 | 0 | 7.5 |
| | | 5 | 4 | 5 | 0.5 |
| | | 10 | 2 | 10 | TR |
| | | 15 | 1 | 15 | — |
| II. | Cellulose Monoacetate (MG-catalyzed - see footnote 5 of Table I) | | | | |
| | | 0 | 5.5 | 0 | 7 |
| | | 5 | 3 | 5 | 4[2] |
| | | 10 | 2 | 10 | 3[2] |
| | | 15 | 1.5 | 15 | 2[2] |
| III. | Cellulose Monobutyrate (freeze-dried - see footnote 3 of Table I) | | | | |
| | | 0 | 8.5 | 0 | 9 |
| | | 5 | 6.5 | 5 | 7 |
| | | 10 | 6 | 10 | 6.5 |
| | | 15 | 5 | 15 | 6.5 |
| IV. | Cellulose Monobutyrate (acetic acid slurry, 15 wt. % butyryl, 11 wt. % acetyl, 14 wt. % hydroxyl) | | | | |
| | | 0 | 7.5 | 0 | 8 |
| | | 5 | 6.5 | 5 | 7 |
| | | 10 | 6 | 10 | 6 |
| | | 15 | 5.5 | 15 | 5.5 |
| V. | Ivory Soap (Bar) | | | | |
| | | 0 | 16 | 0 | <1 |
| | | 5 | 15.5 | 5 | — |
| | | 10 | 15.5 | 10 | — |
| | | 15 | 15.5 | 15 | — |
| VI. | Sodium Laureth-3 Sulfate (28% Active - Henkel) | | | | |
| | | 0 | 17 | 0 | 20 |
| | | 5 | 15[2] | 5 | 16.5[2] |
| | | 10 | 14[2] | 10 | 13[2] |
| | | 15 | 12.5[2] | 15 | 10[2] |

[1]All solutions 0.1% active ingredient
[2]Foam very diffuse with cavities; accurate readings difficult The invention has been described in detail with particular reference to preferred embodiments thereof, but it will be understood that variations and modifications can be effected within the spirit and scope of the invention.

I claim:

1. A mixed cellulose ester having
   9 to 16 weight % butyryl or propionyl;
   6 to 11 weight % acetyl; and
   12 to 15 weight % hydroxyl;
wherein said mixed cellulose ester has a surface tension of less than about 45 dynes/cm measured as a 0.1 weight % aqueous solution.

2. The mixed cellulose ester of claim 1 which is cellulose acetate butyrate.

3. The mixed cellulose ester of claim 1 which is cellulose acetate propionate.

4. The mixed cellulose ester of claim 2 wherein said surface tension is about 37 to about 41 dynes/cm.

5. The cellulose acetate butyrate of claim 2 having 9 weight % butyryl, 11 weight % acetyl and 12 weight % hydroxyl.

6. The cellulose acetate butyrate of claim 2 having 16 weight % butyryl, 8 weight % acetyl and 15 weight % hydroxyl.

7. The cellulose acetate propionate of claim 3 having 13 weight % propionyl, 6 weight % acetyl, and 16 weight % hydroxyl.

8. The cellulose acetate butyrate of claim 2 wherein a 0.1 weight % aqueous solution has a foam height of at least about 7.5 cm as measured in the Ross Miles Foam Test.

9. The cellulose acetate propionate of claim 3 wherein a 0.1 weight % aqueous solution has a foam height of at least about 7.5 cm as measured in the Ross Miles Foam Test.

10. The cellulose acetate butyrate of claim 2 wherein a 0.1 weight % aqueous solution retains at least about 55% of initial foam height after 15 minutes as measured in the Ross Miles Foam Test.

11. The cellulose acetate propionate of claim 3 wherein a 0.1 weight % aqueous solution retains at least about 55% of initial foam height after 15 minutes as measured in the Ross Miles Foam Test.

12. The cellulose acetate butyrate of claim 2 having an inherent viscosity of about 0.01 to about 1.50 as measured with a Schott-Gerate AVS 24 instrument operating at 25° C. at a sample concentration of 0.25 g per 100 ml of DMSO.

13. The cellulose acetate propionate of claim 3 having an inherent viscosity of about 0.01 to about 1.50 as measured with a Schott-Gerate AVS 24 instrument operating at 25° C. at a sample concentration of 0.25 g per 100 ml of DMSO.

14. The cellulose acetate butyrate of claim 2 having an inherent viscosity of about 0.05 to about 0.25 as measured with a Schott-Gerate AVS 24 instrument operating at 25° C. at a sample concentration of 0.25 g per 100 ml of DMSO.

15. The cellulose acetate propionate of claim 3 having an inherent viscosity of about 0.05 to about 0.25 as measured with a Schott-Gerate AVS 24 instrument operating at 25° C. at a sample concentration of 0.25 g per 100 ml of DMSO.

* * * * *